United States Patent

Markus et al.

[11] Patent Number: 6,049,189
[45] Date of Patent: Apr. 11, 2000

[54] VARIABLE SPEED PASSENGER CONVEYOR AND METHOD OF OPERATION

[75] Inventors: Richard Markus, Minden; Oliver Stöxen; Dietmar Thaler, both of Seggebruch, all of Germany

[73] Assignee: Otis Elevator Company, Farmington, Conn.

[21] Appl. No.: 08/738,618

[22] Filed: Oct. 29, 1996

[51] Int. Cl.[7] .................................................. H02P 5/34
[52] U.S. Cl. ........................................ 318/802; 198/322
[58] Field of Search ..................................... 388/805, 812, 388/820, 908; 318/66, 778, 110, 779, 771, 772, 774, 798–818; 198/322, 323, 330, 334, 832.1, 324

[56] References Cited

U.S. PATENT DOCUMENTS

| | | | |
|---|---|---|---|
| 4,232,776 | 11/1980 | Dean | 198/322 |
| 4,499,986 | 2/1985 | Tsuboi et al. | 198/322 |
| 4,631,467 | 12/1986 | Herrmann et al. | 318/798 |
| 4,748,394 | 5/1988 | Watanabe | 318/807 |
| 4,809,841 | 3/1989 | Kitamura | 198/330 |
| 4,956,596 | 9/1990 | Ogashi | 318/801 |
| 5,361,887 | 11/1994 | Zaharia et al. | 198/323 |
| 5,782,330 | 7/1998 | Mehlert et al. | 198/324 |
| 5,785,165 | 7/1998 | Stahlhut et al. | 198/322 |
| 5,842,554 | 12/1998 | Stoxen et al. | 198/332 |

FOREIGN PATENT DOCUMENTS

| | | |
|---|---|---|
| 5861480 | 1/1981 | Australia . |
| 4313424 | 10/1994 | Germany . |
| 03215445 | 8/1991 | Japan . |
| 05055408 | 3/1993 | Japan . |
| 05271556 | 10/1993 | Japan . |
| 9526803 | 10/1995 | Rep. of Korea . |
| 2050984 | 5/1983 | United Kingdom . |

Primary Examiner—Jonathan Salata

[57] ABSTRACT

A control system for a passenger conveyor includes a ready-to-operate mode, a standby speed and a nominal speed. A method to operate the passenger conveyor includes the steps of: transitioning the conveyor from ready-to-operate mode to nominal speed using a frequency converter; switching from frequency converter to line power at nominal speed; switching back to frequency converter if no passengers are present and transitioning from nominal to standby speed; and transitioning from standby speed to ready-to-operate mode if a predetermined amount of time passes without a passenger entering the conveyor.

8 Claims, 4 Drawing Sheets

VARIABLE SPEED PASSENGER CONVEYOR AND METHOD OF OPERATION

TECHNICAL FIELD

The present invention relates to passenger conveyors, and more particularly to control systems for such conveyors.

BACKGROUND OF THE INVENTION

A typical passenger conveyor, such as an escalator or moving walk, includes a truss, a plurality of sequentially connected treadplates traveling through a closed loop path within the truss, and a machine for driving the treadplates. A control system is used to control the operation of the conveyor for such parameters as speed and direction. Such conveyors are a very efficient means to move large numbers of passengers between floors or locations.

In modem conveyors, the control systems have become increasingly complex in an effort to improve efficiency and reduce wear and cost of operation. One such control system incorporates a sensor to detect passengers entering the conveyor. Upon detection of a passenger, the conveyor is switched on and the treadplates begin moving. After the passenger exits the conveyor, the conveyor is switched off. This type of control system saves energy by not running continuously during no-load conditions. A drawback to this system, however, is the generation of peak loads during the frequent switching on and off of the conveyor.

One disclosed solution to this problem is to use a variable frequency converter to control the operation of the conveyor. An example of this type of controller is disclosed in U.S. Pat. No. 4,748,394, entitled "Control Apparatus for Escalator" and issued to Watanabe. This patent discloses an escalator operating at two speeds. At low speed, the motor is controlled by the frequency conversion means to operate at the low speed until a passenger is detected. Upon detection, the frequency is gradually raised until there is synchronization between the current generated from the frequency conversion means and the power source. At that point, the motor is switched to the power source. A similar concept is proposed in published German Patent Application No. 4,313,424 A1. While this solution may provide some benefits, even when operated at a reduced speed wear of the escalator components still occurs and energy is wasted during no-load conditions.

The above art notwithstanding, scientists and engineers under the direction of Applicant's Assignee are working to develop drives and control systems for passenger conveyors that improve efficiency and minimize wear.

DISCLOSURE OF THE INVENTION

According to the present invention, a method of operation of a variable speed passenger conveyor includes the steps of: operating the conveyor in a ready-for-operation mode such that it is not moving, increasing the speed of the conveyor to the nominal speed upon sensing a passenger entering the conveyor, and, after the exit of all passengers, maintaining the operation of the conveyor at a stand-by speed for a predetermined amount of time. The stand-by speed is less than the nominal speed. If no further passengers are detected entering the conveyor before the end of the predetermined time period, the conveyor is returned to the ready-for-operation mode.

As a result of the ready-for-operation mode and the predetermined period of operation at stand-by speed, the wear of the conveyor is reduced. During extended periods without passengers, the conveyor is not moving and therefore wear is not occurring and energy is saved. During periods of high passenger traffic, the conveyor will be operating at either the nominal speed or at the stand-by speed. During these periods, it is readily apparent to approaching passengers that the conveyor is operational and frequent starting and stopping of the conveyor is avoided.

Further, this embodiment may be used with or without a two speed motor and may be incorporated into the software of the control system, thus requiring no further equipment.

In a particular embodiment of the present invention, the step of increasing the speed of the conveyor to the nominal speed is accomplished by using a frequency converter to gradually increase the speed. Once the conveyor is at the nominal speed, the drive is switched to line power. This state is maintained until no further passengers are sensed. The drive is then switched back to frequency converter operation and the frequency is decreased until the conveyor reaches the predetermined stand-by speed. If further passengers are sensed, the frequency converter increases the speed back to the nominal speed, and power is then switched back to line power. If the predetermined amount of time elapses without another passenger being sensed, the frequency converter reduces the speed of the conveyor to the ready-for-operation mode.

As a result of only using the frequency converter for the transitions in speed and the stand-by speed only, rather than to maintain the operation at the nominal speed, the size of the converter may be minimized. In addition, during the operation of the conveyor in the down direction, energy may be regenerated directly to the power source line without the need for additional equipment, such as an energy regeneration system. Further, having available both the frequency converter operation and the line power operation improves the reliability of the drive. In the event of a failure of the frequency converter, the conveyor may be operated in a continuous mode at the nominal speed by the line power until the frequency converter is repaired or replaced.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
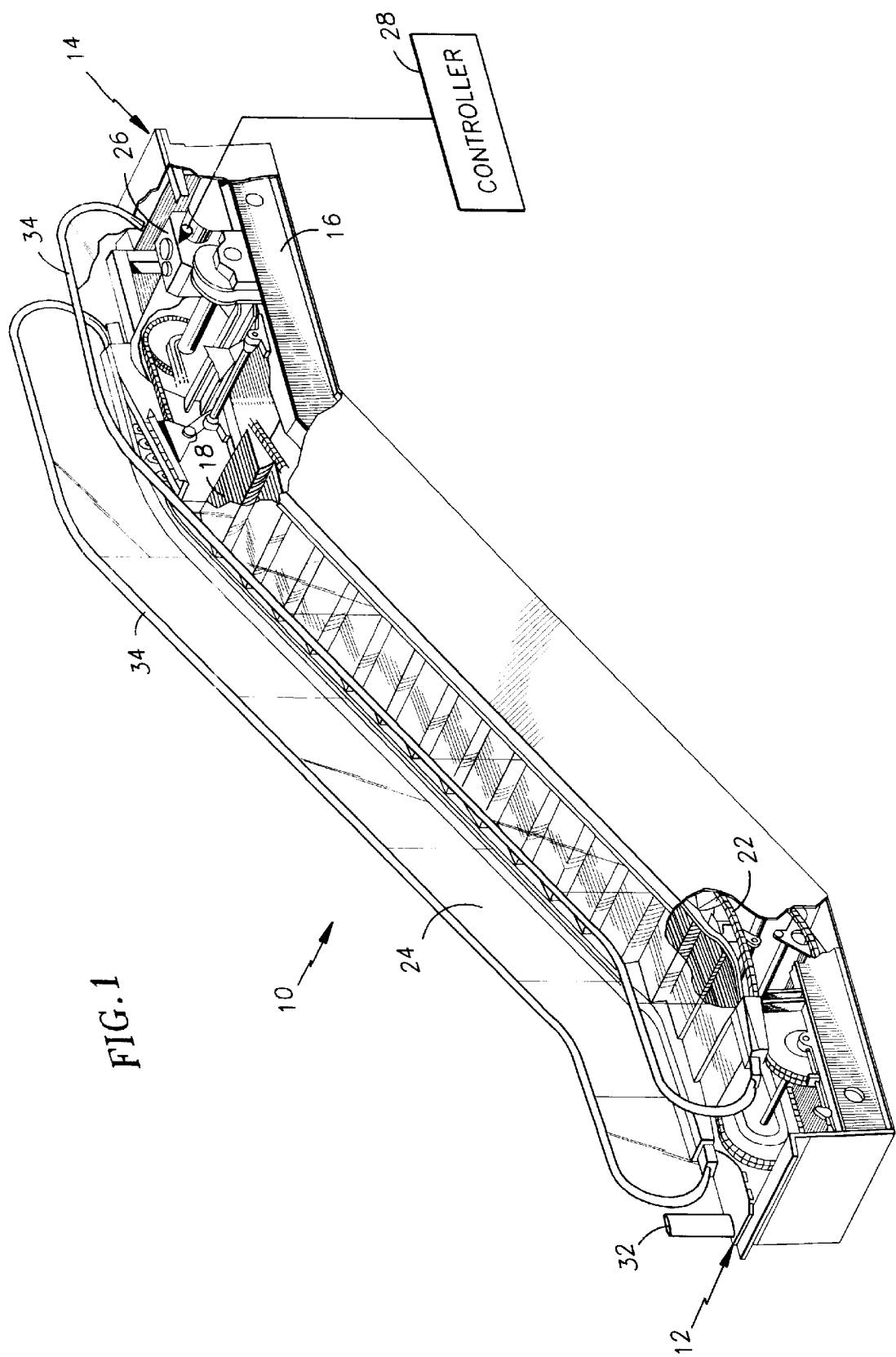
FIG. 1 is a perspective view, partially cut away, of an escalator.

An escalator, as shown in FIG. 1, is used herein as a representative passenger conveyor to illustrate the invention. It will become apparent that the invention is also applicable to other types of passenger conveyors, such as moving walks.

The escalator 10 includes a first landing 12, a second landing 14, a truss 16, a plurality of sequentially connected treadplates 18, a step chain 22 for driving the treadplates 18, a pair of balustrades 24 extending along both sides of the treadplates 18, a drive machine 26 operatively connected to the step chain 22, a controller 28 engaged with the drive machine 26, and a passenger sensor 32. The treadplates define the platforms for carrying passengers between the first and second landings. Each of the balustrades 24 include a moving handrail 34 that is driven at the same speed as the treadplates 18.

Figure 2:
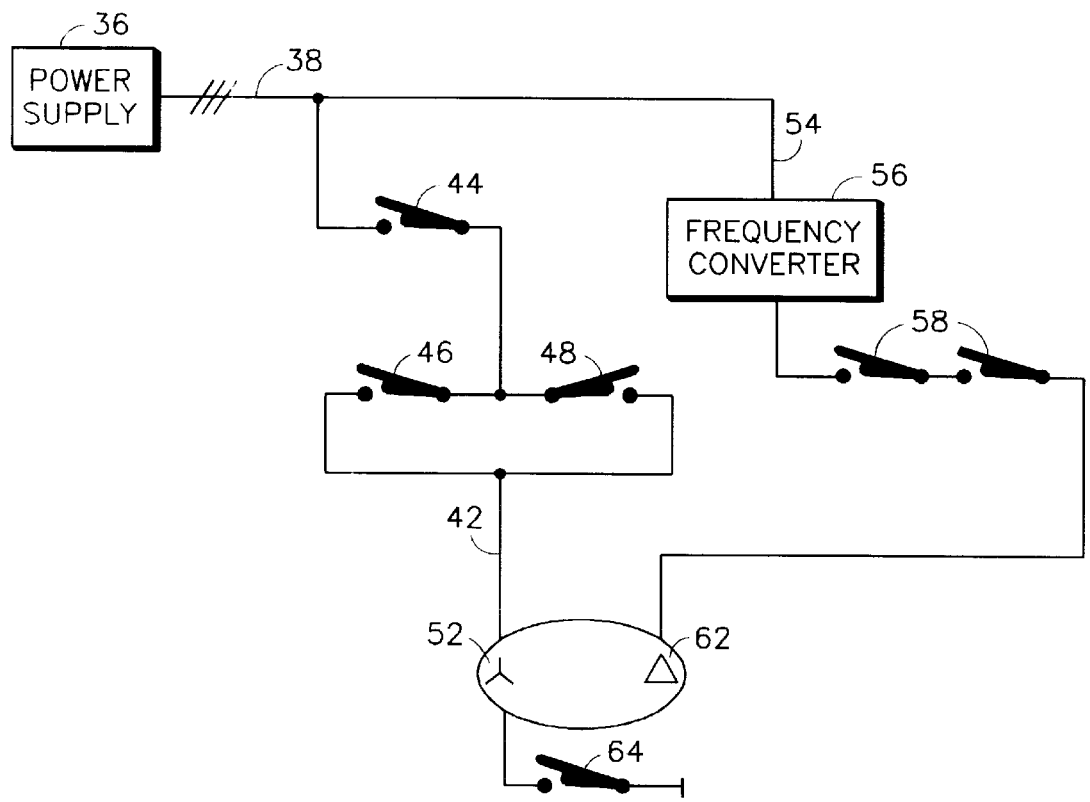
FIG. 2 is a illustrative circuit diagram of the controller for the escalator.

The controller 28 determines the power input to the drive machine 26 and thereby controls the speed of the drive machine 26, which in turn controls the speed of the treadplates 18. FIG. 2 illustrates a simplified circuit diagram for the controller 28. The controller 28 is connected to a supply of power 36 by a first line 38. A second line 42 includes a first switch 44, an up switch 46 and a down switch 48. The second line 42 is connected into the drive machine 26 via a Star connection 52. A third line 54 includes a frequency converter 56 and a pair of switches 58. The pair of switches 58 are used to ensure that if one switch fails to open, the second opening of the second switch will ensure the conveyor is stopped. The change in direction of the escalator 10 is accomplished by the frequency converter 56 during stand-by operations and during transitions between operating modes. The third line 54 is connected into the drive machine 26 via a Delta connection 62. As is well known in the art, the Delta type connection 62 results in the machine 26 having twice as many poles as the Star type connection 52. A fourth switch 64 is disposed between the Star-Delta connections 52,62 and the machine 26, and determines the operation of the Star-Delta connections 52,62. With this switch 64 closed, the machine 26 is operated through the Star connections.

The machine 26 is a conventional asynchronous motor that, in conjunction with the Star-Delta type connections 52,62, has the ability to produce at least two different speeds. The use of the frequency converter 56 expands the possibilities for the speed output by the machine 26.

With the first switch 44 and fourth switch 64 closed, and one of the up/down switches 46,48 closed, power is transmitted from the power supply 36 through the Star connection 52 and into the drive machine 26. The drive machine 26 then operates under the line power and at its nominal speed for that line power.

With the first switch 44 and the fourth switch 64 open, and the pair of switches 58 closed, power is transmitted through the frequency converter 56, through the Delta connection 62 and into the drive machine 26. If the frequency converter 56 is operated at the same frequency as the power supply 36, the drive machine 26 will operate at half of the nominal speed because of the additional poles introduced by the Delta connection 62. If the frequency converter 56 is operated at twice the frequency of the line power, then the drive machine 26 will operate at the same speed as the nominal speed.

Figure 3:
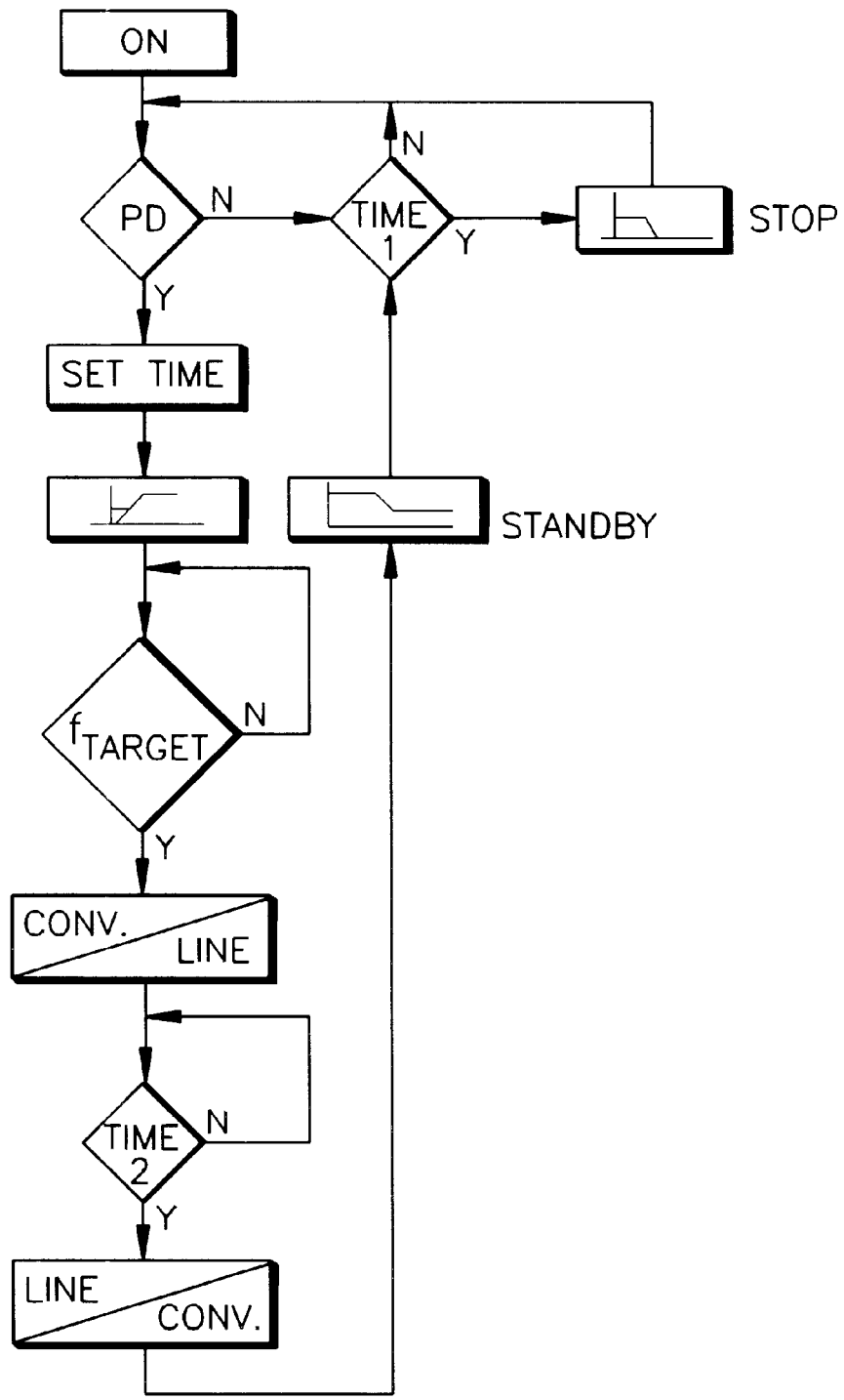
FIG. 3 is a flow chart illustrating the method of operation of the escalator.

FIG. 3 illustrates a flow chart for the controller 28. The first step is to power up the escalator 10. In the next step, the controller 28 determines if the passenger sensor 32 has sensed an arriving passenger. If no passenger is sensed, the controller 28 maintains the escalator 10 and drive machine 26 in the powered up state or ready-to-operate mode. In this mode, the treadplates 18 are not moving.

If the passenger sensor 32 provides a signal indicating the arrival of a passenger, the controller 28 then sets the time for the ramp up in frequency of the converter. Next the controller 28 closes the pair of switches 58 (see FIG. 2) and gradually increases the frequency of the frequency converter 56 to twice the line frequency within the time set in the previous step. The controller 28 continually tests the frequency until the target frequency is achieved. Once it is achieved, the first switch 44 and fourth switch 64 are closed and the pair of switches 58 are opened simultaneously. As a result, the drive machine 26 is switched to the line power through the Star connection 52. Since the speed produced by the line power and the speed produced by the frequency converter 56 operated at the target frequency is the same, any jerk felt by the passengers should be minimal.

The drive machine 26 is operated under line power until a first timer expires indicating that a predetermined time period has elapsed without any additional passengers entering the escalator 10. Additional passengers entering the escalator 10 during operation at the nominal speed would restart the first timer. A suggested amount of time for the predetermined time period is the amount of time it takes for a treadplate 18 to travel a complete loop at the nominal speed.

Once the predetermined time period elapses, the drive machine 26 is switched back to frequency converter 56 control, i.e., the first switch 44 and fourth switch 64 are opened and the pair of switches 58 are closed, with the frequency equal to twice the line frequency. This frequency is then gradually reduced to the line frequency such that the drive machine 26 operates at half the nominal speed, hereinafter referred to as the stand-by speed.

Once the stand-by speed is reached, a second timer is triggered. This timer has a second predetermined amount of time selected by the operator of the passenger conveyor. The specific amount of time may depend on such factors as expected level of passenger traffic. By selecting a longer amount of time, the drive machine is less likely to be stopped. On the other hand, if a shorter time period is selected, the drive machine will be shut down more frequently.

After triggering of the second timer, the controller 28 continues to check to see if additional arriving passengers have been detected by the passenger sensor 34. If a passenger arrives while the drive machine 26 is operating in a stand-by mode, the controller 28 begins the process of transitioning back to the nominal speed. If the second timer expires before the next passenger arrives, the second pair of switches 58 are opened. As a result, the drive machine 26 and the treadplates 18 are stopped.

Figure 4:
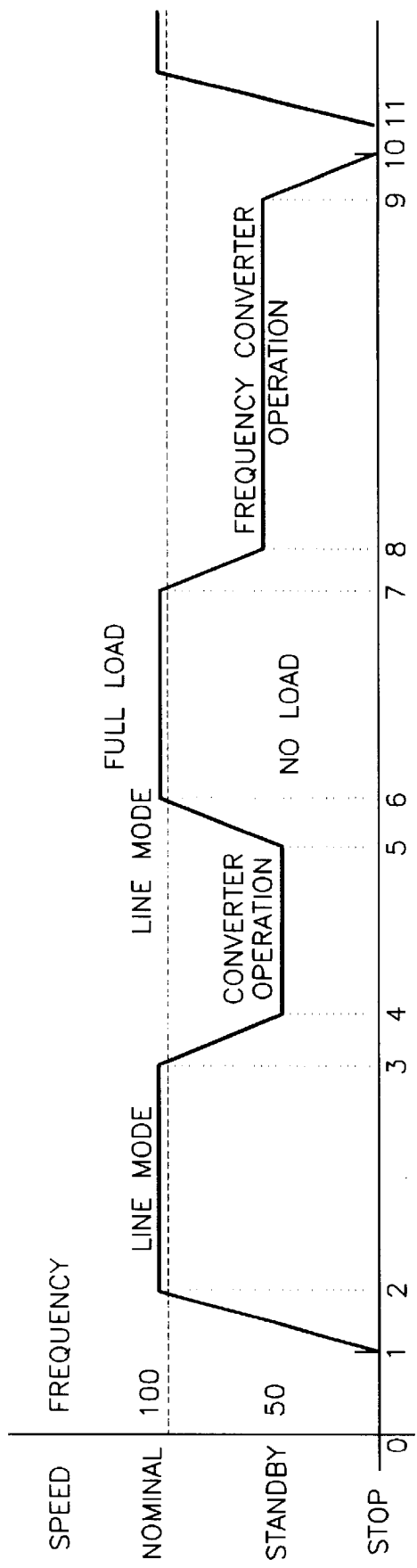
FIG. 4 is a representative speed profile of the escalator operating according to the invention.

FIG. 4 represents an exemplary speed profile for an escalator operated using the present invention. At time=0, the drive machine and treadplates are stopped. At time=1, a passenger is detected, the frequency converter is powered and the controller transitions the drive machine to the nominal speed by increasing the frequency of the frequency converter to twice the line frequency. At time=2, the drive machine is switched to line power and this status is maintained until the first timer expires (time=3). At this point, the drive machine is switched back to frequency converter control and the controller transitions the drive machine down to the stand-by speed by decreasing the frequency. At time=4, the second timer is set, but before it expires another passenger is sensed (time=5) and the controller transitions the drive machine back to the nominal speed by increasing the frequency of the converter (time=6). At this point, the drive machine is again switched to line power and maintained in this state until the first timer expires. At time=7, the drive machine is switched back to the converter and the controller transitions the drive machine back to stand-by speed and the second timer is triggered (time=8). Once this second timer expires without another passenger being sensed (time=9), the controller transitions the drive machine into the ready-to-operate mode, i.e., speed of the drive machine and the treadplates equals zero (time=10). At time=11, another passenger is sensed and the process begins anew.

Although the invention has been shown and described with respect to exemplary embodiments thereof, it should be understood by those skilled in the art that various changes, omissions, and additions may be made thereto, without departing from the spirit and scope of the invention.

What is claimed is:

1. A method to operate a passenger conveyor, the passenger conveyor having a platform moveable between a pair of landings, a passenger sensor, a drive for providing actuation of the moving platform, a source of power for the drive, and a frequency converter, the frequency converter disposed between the power source and the drive, the method including the steps of:

sensing a passenger entering the passenger conveyor;

transitioning the speed of the platform to a nominal speed by increasing the frequency generated by the frequency converter;

switching the drive to be directly powered by the power source after the platform speed reaches the nominal speed, switching the drive to frequency control if it is determined that no passengers remain on the passenger conveyor;

transitioning the platform speed to a stand-by speed by decreasing the frequency generated by the frequency converter, the stand-by speed being less than the nominal speed; and transitioning the passenger conveyor from the stand-by speed to a ready-to-operate condition if a predetermined amount of time elapses without a passenger entering the passenger conveyor, wherein in the ready-to-operate condition the platform is stopped.

2. The method according to claim 1, wherein the passenger conveyor further includes a timer defining the predetermined time period, and wherein the method includes the step of starting the timer after the exit of the passenger from the passenger conveyor.

3. The method according to claim 1, wherein the passenger conveyor further includes a timer defining a second predetermined amount of time, and wherein the method further includes the steps of starting the timer after each passenger enters the escalator, and wherein the step of transitioning the passenger conveyor to the stand-by speed is performed after the second predetermined amount of time elapses.

4. A passenger conveyor including:

a platform moveable between a pair of landings;

a passenger sensor outputting a signal indicative of the presence or absence of passengers; and a control system for the passenger conveyor, the control system transitioning the speed of the platform to a nominal speed upon receiving a signal from the passenger sensor indicating the presence of a passenger, transitioning the speed of the platform to a stand-by speed, which is less than the nominal speed, upon receiving a signal from the passenger sensor indicating the absence of passengers, and transitioning the speed of the platform from stand-by speed to a ready-to-operate speed, in which the movement of the platform is stopped, if the passenger sensor indicates the absence of passengers for a predetermined amount of time.

5. The passenger conveyor according to claim 4, further including:

a drive for providing activation of the moving platform;

a source of power for the drive; and a frequency converter, the frequency converter disposed between the power source and the drive;

wherein the control system transitions the speed of the platform to a nominal speed by increasing the frequency generated by the frequency converter, and switches the drive to be directly powered by the power source after the platform speed reaches the nominal speed.

6. The passenger conveyor according to claim 5, wherein the control system switches the drive to frequency control if the passenger sensor indicates the absence of passengers and transitions the platform speed to a stand-by speed by decreasing the frequency generated by the frequency converter.

7. The passenger conveyor according to claim 4, further including a timer defining the predetermined time period.

8. The passenger conveyor according to claim 7, further including a timer defining a second predetermined amount of time, and wherein the control system starts the timer after each passenger enters the escalator, and wherein the control system transitions the passenger conveyor to the stand-by speed after the second predetermined amount of time elapses.

* * * * *